(12) United States Patent
Chao et al.

(10) Patent No.: US 6,549,513 B1
(45) Date of Patent: Apr. 15, 2003

(54) METHOD AND APPARATUS FOR FAST DISTRIBUTED RESTORATION OF A COMMUNICATION NETWORK

(75) Inventors: Tzu-Lien Tim Chao, Plano, TX (US); Manouchehr Darabpour, Carrollton, TX (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/416,545

(22) Filed: Oct. 12, 1999

(51) Int. Cl.[7] .................................................. H04J 1/16
(52) U.S. Cl. ........................................ 370/227; 370/228
(58) Field of Search ................................. 370/221, 216, 370/217, 218, 222, 223, 225, 226, 227, 228

(56) References Cited

U.S. PATENT DOCUMENTS

| | | | |
|---|---|---|---|
| 4,956,835 A | * 9/1990 | Grover | 370/228 |
| 5,065,399 A | * 11/1991 | Hasegawa et al. | 370/228 |
| 5,093,824 A | * 3/1992 | Coan et al. | 370/228 |
| 5,235,599 A | * 8/1993 | Nishimura et al. | 340/2.23 |
| 5,444,693 A | * 8/1995 | Arslan et al. | 370/221 |
| 5,495,471 A | * 2/1996 | Chow et al. | 370/221 |
| 5,748,611 A | 5/1998 | Allen et al. | |
| 5,812,524 A | 9/1998 | Moran et al. | |
| 5,850,505 A | * 12/1998 | Grover et al. | 714/4 |
| 6,377,543 B1 | * 4/2002 | Grover et al. | 370/227 |
| 6,404,734 B1 | * 6/2002 | Stamatelakis et al. | 370/227 |
| 6,421,349 B1 | * 7/2002 | Grover | 370/408 |

FOREIGN PATENT DOCUMENTS

WO    WO 98/41041 A1    9/1998

OTHER PUBLICATIONS

Grover, W.D.; "Distributed Restoration of the Transport Network", IEEE Network Management Intothe 21st Century, Chapter 11, Feb. 1994.

* cited by examiner

Primary Examiner—Wellington Chin
Assistant Examiner—William Schultz
(74) Attorney, Agent, or Firm—Donald D. Mondul; V. Lawrence Sewell; Jessica W. Smith

(57) ABSTRACT

A method for distributed managing of restoration paths within a communication network having nodes connected by links; comprising the steps of: (a) establishing a spare link catalog identifying unassigned links connecting each selected node with an adjacent node; (b) sending a probe message from each node to each adjacent node over an unassigned link; (c) evaluating the probe message at each adjacent node according to predetermined criteria; (d) forwarding the probe message to subsequent adjacent nodes, or discarding the probe message, as determined by the evaluating; (e) appending message content to the probe message indicating the path sequence traversed by the probe message proceeding through the network; (f) evaluating the forwarded probe message at each said subsequent node according to the predetermined criteria; (g) repeating steps (d) through (f) for each forwarded probe message until it is discarded or is received by the probe message originating node; (h) the probe message originating node noting each message receipt of its own probe message, each such message receipt including a recital of a restoration path in the path sequence; and (i) recording each message receipt in a restoration path register in a data store at a plurality of selected storage nodes.

11 Claims, 5 Drawing Sheets

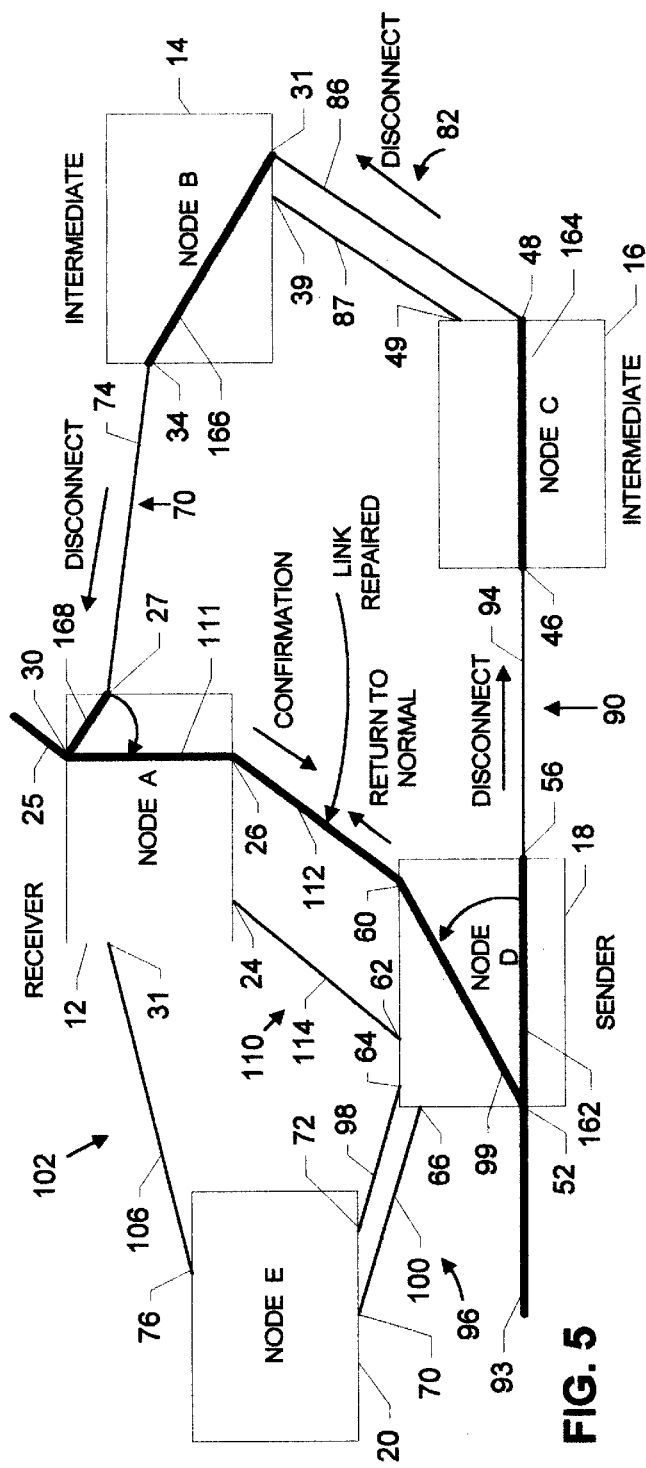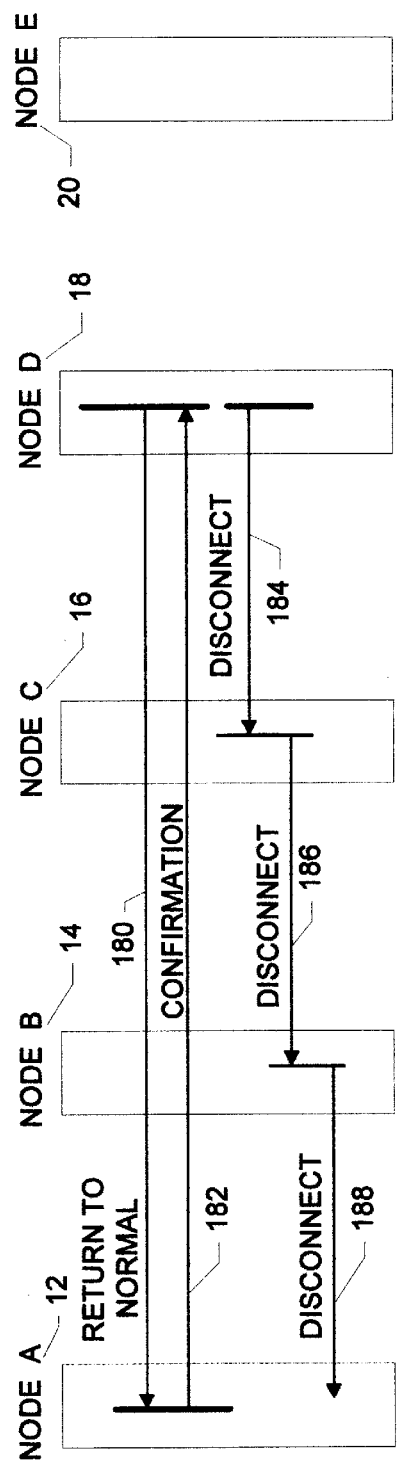

METHOD AND APPARATUS FOR FAST DISTRIBUTED RESTORATION OF A COMMUNICATION NETWORK

BACKGROUND OF THE INVENTION

In today's high-speed communication networks, each cable or fiber carries several thousand voice or data circuits. Such large network capacity provides advantages in terms of lower costs and greater payload flexibility. Fiber optic networks enjoy such advantages and other additional advantages, such as improved transmission quality. Whatever the cable technology—wire or fiber—interruptions in communication service are not uncommon. Networks have been known to suffer damage from backhoes at construction sites, power augers, lightning, rodents, fires, train derailments, bullets, vandalism, car crashes, ship anchors, trawler nets, and diverse other mishaps. Given the ubiquitous nature of communications today with its intimate involvement in business, medicine, finance, education, air traffic control police and other government agencies, and other aspects of modern life, it is imperative that interruptions in network operations be restored as quickly as possible in the event of a failure.

The precarious integrity of networks has been recognized, and approaches have been developed for effecting restoration of cable breaks. One such approach has been the implementation of automatic protection switching (APS). APS systems restore service by switching to a dedicated standby system. That is, there are two complete sets of links installed in an APS system so that each link has a back-up link ready and waiting to serve.

In the context of this specification, the term "link" is intended to indicate any communication path intermediate two adjacent nodes, or communication units, in a communication network. Adjacent nodes are communication units, such as cross connect systems, that are connected by a span. There can be more than one link in a span; a span is the set of all links in parallel between two adjacent nodes.

Another recovery system approach is the self-healing ring. Self-healing rings (SHR) vary in the details of their implementation, but they can be conceptualized as an extension of either a 1:1 (100% redundancy) or a 1:N (greater than 100% redundancy) APS system. APS and SHR systems can effect recovery in 50 to 150 milliseconds. Such rapid recovery is very good, but the cost of such systems is prohibitively high except or the most critical of networks, such certain banking, medical, or stock market systems.

Mesh networks have been recognized a useful in providing flexibility in recovering from network interruptions. A mesh network is a network in which each node may be connected to all other nodes in the network via links to adjacent nodes. By using intelligent internetworking devices, such as nodal multiplexers in a T-carrier network, transmissions may be routed over an alternative path should the primary (direct) path between two sites be interrupted. Such interruption may be occasioned by congestion, or by a physical or electrical failure.

Centralized restoration in a mesh network has been attempted, with the calculation of a restoration path being effected at a central location within the network using data stored at that central location. After determination of the restoration path, the information is promulgated throughout the network for implementation. Such centralized restoration systems have not succeeded in restoring network communications in less than times in excess of one minute. With the high capacity time-sensitive information being carried on networks today, such a recovery time is unacceptably slow.

Distributive restoration in a mesh network is another approach that has been discussed in attempting to accommodate restoration of a network. This distributed approach recognizes that digital cross-connect switches employed at nodes in a mesh network are computers, and they collectively represent considerable processing power embedded in a fabric of multiple communication links. In such a distributed approach, every node (digital cross-connect switch) will perform to effect restoration as required in an apparently isolated manner, with no network-wide knowledge of the system. The independently deduced cross-connection decisions of each node will, in the aggregate, collectively constitute effective multipath rerouting plans.

Most of the distributive restoration systems are less costly than an APS or an SHR system. However, the trade-off is that recovery time is not nearly as fast with the duplicative recovery systems. This stands to reason since there is no dedicated link to which traffic can be routed with very little delay. Most distributive restoration systems depend upon a flooding of the network with messages once an interruption is detected. The flooding messages explore all routes then viable in the network. The route (a series of spans denoted by a concatenation of nodes that establishes a way through the network) is sen according to some predetermined route-choosing criteria. Such criteria may include the first (shortest) path identified, the greatest-capacity path, the inclusion of specified nodes within the path, the greatest path length efficiency, the fastest path, or other parameters.

Distributed restoration systems that determine restoration paths after a failure is detected rarely are capable of effecting restoration in less than one second. Such a delay is still unacceptable.

Grover (W. D. Grover, "Distributed Restoration of the Transport Network", IEEE Network Management Into the $21^{st}$ Century, Chapter 11, February 1994) proposes distributed preplanning for restoration using a digital restoration algorithm. According to Grover's proposal, a self-healing network protocol is executed for each possible span failure in the network. This is accomplished by a full execution of the self-healing network protocol, but without actually making any cross-connections to effect rerouting. Instead, each node is to record the cross-connections it would have made according to the self-healing network protocol, and save those cross-connections in a table. In such manner, each node will have stored in a table the instructions for that node's portion of the response to the self-healing network protocol for each and every respective span of the network. When a failure occurs, the network promulgates an alerting message and any alerted node having non-null actions in its respective table makes the internal cross-connections between spare ports that are listed in its table.

Grover's proposed distributed preplanning involves storing in a table at each node each and every connection that node must participate in for each and every failure case. Such a table takes a significant amount of computing to amass, and a significant amount of time to complete. Grover himself acknowledges that there is a window of vulnerability on the order of seventeen minutes for a 100-span network. According to Grover, alerting can be accomplished either by an activation loop established through all digital cross-connect system (DCS) nodes, or by disseminating the alert through simple flooding. By either of Grover's alerting schemes full promulgation of that message necessary to effect restoration configuration, as each node "consults" its respective table to determine how to participate in the restoration evolution, takes time and network capacity as well. The complexity of constructing Grover's all-connection tables is also further cause for concern as the more complex an operation is, the more aught with opportunity for error it is. Said another way, as a general rule, the more complex a system, the less robust and reliable it is.

Further, Grover does not address how or when the system updates its information regarding which links in the network are actually spare links and available for use in restoration operations. He provides that links used in a restoration path are identified as "in use", but no allowance is made to identify when a link is not available for restoration operations for any other reason, such as a system reorientation, new subscribers on the system causing use of an additional (previously unused) link, or similar situations.

There is a need for a restoration system for a communication network that is robust and reliable. Such a system should have a relatively simple and efficient approach to identifying restoration paths through the network, alerting appropriate network locations of the need for their participation in restoration on a timely basis, and automatically updating the restoration information periodically in a self-learning mode of operation.

SUMMARY OF THE INVENTION

The invention is a method and apparatus for distributed managing of restoration paths within a communication network. The network includes a plurality of nodes connected by a plurality of internodal links, selected links of the plurality of internodal links being assigned links, other links being unassigned links. The preferred embodiment of the method of the present invention comprises the steps of: (a) establishing for selected nodes of the plurality of nodes a spare link catalog identifing each extant unassigned link connecting each selected node with an adjacent node; (b) operating each selected node as a probe originating node to send a probe message to each adjacent node over at least one unassigned link, preferably over one unassigned link; (c) evaluating the probe message at each adjacent node according to predetermined message handling criteria; (d) at each adjacent node, forwarding the probe message as a forwarded probe message to subsequent nodes adjacent to each adjacent node, or discarding the probe message, such forwarding or discarding being determined by the evaluating; (e) appending message content to the forwarded probe message indicating the node-to-node path sequence traversed by the probe message proceeding through the network; (f) evaluating the forwarded probe message at each subsequent node according to the predetermined message handling criterion; (g) repeating steps (d) through (f) for each forwarded probe message until the forwarded probe message is discarded or is received by the probe originating node as its own probe message; (h) the probe originating node noting each message receipt of its own probe message from other than an adjacent node; each message receipt including a recital of a restoration path in the node-to-node path sequence; (i) recording each message receipt in a restoration path register in a data store at a plurality of selected storage nodes of the network.

The method of the present invention may comprise the further steps of: (j) on detection of a link failure intermediate a first node and a second node, designating one of the first and second nodes as a sender node, and the other node as a receiver node; (k) operating the sender node to choose a selected restoration route from its restoration path register according to predetermined route selection criteria; (l) building a connection message at the sender node identifying the selected restoration route; (m) conveying the connection message to the receiver node; (n) establishing a bidirectional connection in each node intermediate the sender node and the receiver node in the selected restoration path; and (o) cooperatively orienting the sender node and the receiver node to effect communications via the selected restoration route.

The apparatus of the present invention is a communication network system having a distributed restoration capability, the system comprising: a plurality of communication nodes for generating and handling messages, at least some of the nodes including a data store; a plurality of internodal communication links connecting the plurality of nodes; a spare link catalog distributively stored in at least some of the data stores and connected with the plurality of internodal links. The spare link catalog identifies each extant unassigned link connecting first selected nodes of the plurality of nodes with each node adjacent to each first selected node. The apparatus further comprises a restoration path register distributively stored in at least some of the data stores and connected with the plurality of internodal links. The restoration path register identifies alternate paths assignable from second selected nodes of the plurality of nodes to each node adjacent to each second selected node. The restoration path register includes node sequence information relating paths traversed by full-circuit probe messages sent by probe originating nodes of the plurality of nodes. Full-circuit probe messages are those probe messages which have been dispatched by a respective probe originating node, traversed more than one node other than the respective probe originating mode, and returned to the respective probe originating node.

The system responds to a disruption of communications on one of the internodal communication links intermediate a first node and a second node of the plurality of nodes by operating one node of the first and second node to choose a selected restoration route from the restoration path register according to predetermined route selection criteria. The one node communicates the selected restoration route to the other node, and the one node and the other node orient to cooperatively effect communications via the selected restoration route.

It is, therefore, an object of the present invention to provide a method and apparatus for distributed managing of restoration paths within a communication network that are robust and reliable.

A further object of the present invention is to provide a method and apparatus for distributed managing of restoration paths within a communication network which are simple and efficient in their approach to identifying restoration paths through the network.

Yet a further object of the present invention is to provide a method and apparatus for distributed managing of restoration paths within a communication network which are simple and efficient in their approach to alerting appropriate network locations of the need for their participation in restoration on a timely basis.

A further object of the present invention is to provide a method and apparatus for distributed managing of restoration paths within a communication network which are simple, efficient and fast in establishing restoration paths through the network.

Still a further object of the present invention is to provide a method and apparatus for distributed managing of restoration paths within a communication network which are simple and efficient in their approach to automatically updating restoration information periodically in a self-learning mode of operation.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE DRAWINGS

FIG. 5 is a schematic diagram of a portion of the simplified network presented in FIG. 1, illustrating normalization of routing after link repair, according to the present invention.

FIG. 6 is a schematic message ladder diagram illustrating messages effecting the normalization of routing represented in FIG. 3.

DETAILED DESCRIPTION OF THE INVENTION

Figure 1:
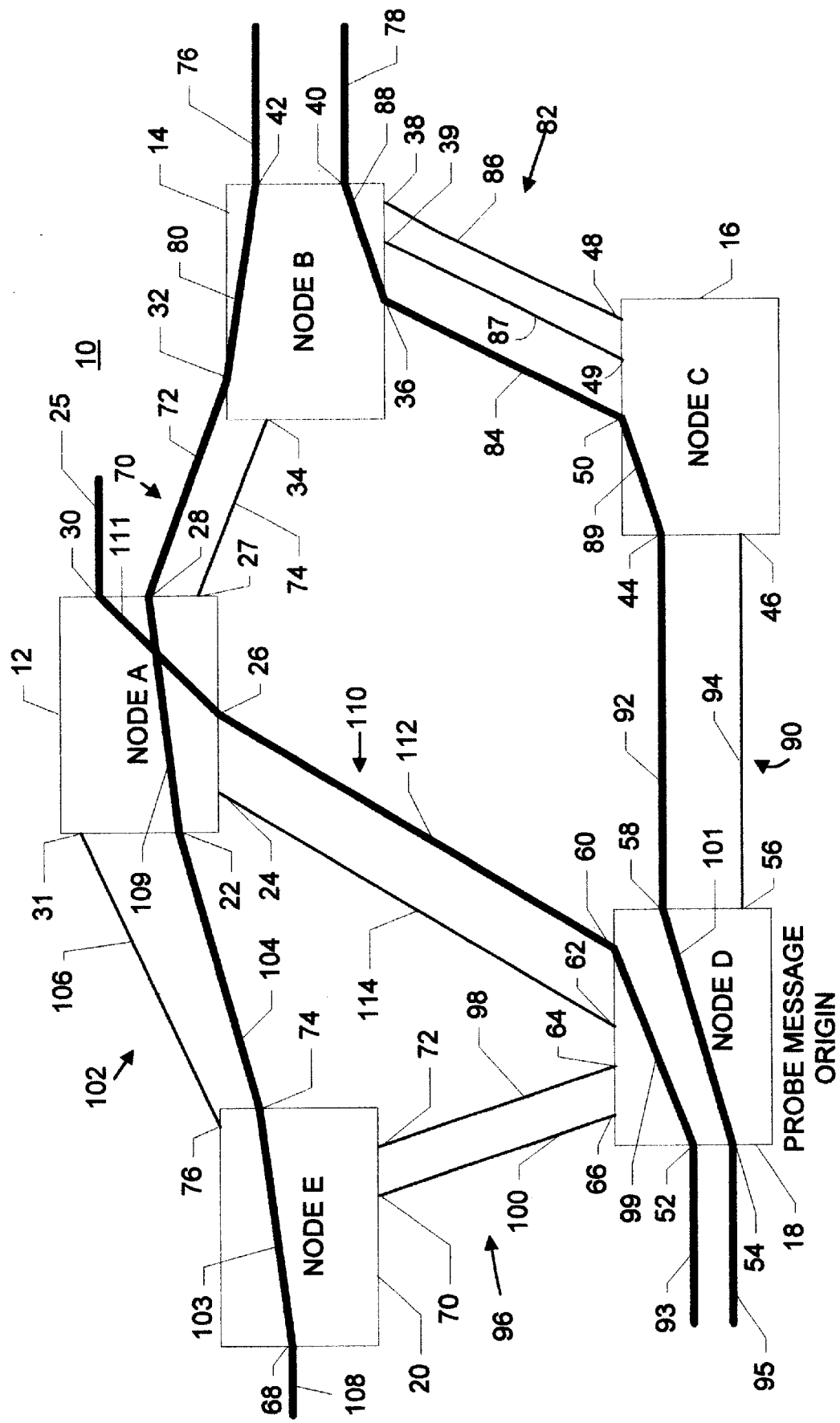
FIG. 1 is a schematic diagram of a portion of a simplified network appropriate for employment of the present invention.

FIG. 1 is a schematic diagram of a portion of a simplified network appropriate for employment of the present invention. In FIG. 1, a network 10 has a Node A 12, a Node B 14, a Node C 16, a Node D 18, and a Node E 20. The preferred embodiments of the apparatus and method of the present invention contemplate employment of the invention with a SONET/SDH system having inter-cross-connect links at an OC-48 level. For this reason, a bidirectional circuit is assumed throughout the description of the invention in this specification. It is stressed, however, that such an OC-48 system is referred to here for the purposes of illustration only, and that the method and apparatus of the present invention are employable with other network configurations with equally beneficial results. In networks such as OC-48 networks, when a working link between two nodes fails, it is possible that any spare link within the same span (a span is the set of all links in parallel between two adjacent nodes) will also fail later. It is for this reason that the present invention selects a restoration path using spare links which are not within the same span as the failed link. A spare link is a fully equipped link that is operational but is not in service, and can be accessed by the present invention for use in restoration operations. Such an approach to selecting restoration paths is valid in real world operations because an automatic protection switching (APS) system can be deployed if protection within the same span as the failed link is desired.

In FIG. 1, Node A 12 effects connection with network 10 through ports 22, 24, 26, 27, 28, 30, 31; Node B 14 effects connection with network 10 through ports 32, 34, 36, 38, 39, 40, 42; Node C 16 effects connection with network 10 through ports 44, 46, 48, 49, 50; Node D 18 effects connection with network 10 through ports 52, 54, 56, 58, 60, 62, 64, 66; and Node E 20 effects connection with network 10 through ports 68, 70, 72, 74, 76.

A span 70 intermediate Node A 12 and Node B 14 includes a working link 72 (indicated as a heavy line, as are all working links in FIG. 1) and a spare link 74 (indicated as a non-heavy line, as are all spare links in FIG. 1). Working link 72 is connected with Node A 12 via port 28, and is connected with Node B 14 via port 32. Spare link 74 is connected with Node A 12 via port 27, and is connected with Node B 14 via port 34. Node A 12 is connected with a working link 25 via a port 30 for connection with other components not shown in FIG. 1. Such other components may be other nodes in network 10, terminating or interface nodes establishing interfaces between network 10 and another network or a telephone central office, or another communication entity.

Node B 14 is connected with working links 76, 78 for connection with other components not shown in FIG. 1. Connection between working link 76 and Node B 14 is effected via a port 42; connection between working link 78 and Node B 14 is effected via a port 40. A bidirectional connection 80 connects ports 32, 42 to effect communications between working links 72, 76.

In the preferred embodiment of the present invention, bidirectional connection 80, and other bidirectional connections to be described below in connection with FIG. 1, are preferably established using a head-end-bridge and a switch employed together. The construction of a head-end-bridge provides a unidirectional connection having a single input and a plurality of outputs. Thus, bidirectional connection 80 may effect communications in one direction using a head-end-bridge with a single input connected with port 32, and with one of a plurality of outputs connected with port 42 (the remaining outputs of the plurality of outputs are not shown in FIG. 1). Also involved in the preferred construction establishing bidirectional connection 80 is a cross-point switch which changes an input from a first cross-point to another cross-point. Such a switch would preferably be employed in establishing bidirectional connection 80, for example, to switch inputs received at port 42 from a first cross-point (not shown in FIG. 1) to a second cross-point which is connected with bidirecional connection 80. Such employment of head-end-bridge and cross-point switches to establish a bidirectional connection is a particular, preferred, construction. Other constructions may also be employed to establish bidirectional connections without straying beyond the intended scope of the present invention.

Node B 14 is also connected with Node C 16 via a span 82. Span 82 includes a working link 84 and spare links 86, 87. Working link 84 connects with Node B 14 via port 36, and connects with Node C 16 via port 50. Spare link 86 is connected with Node B 14 via port 38, and is connected with Node C 16 via port 48. Spare link 87 is connected with Node B 14 via port 39, and is connected with Node C 16 via port 49. A bidirectional connection 88 is provided in Node B 14 to connect working link 78 with working link 84 via ports 36, 40.

A span 90 intermediate Node C 16 and Node D 18 includes a working link 92 and a spare link 94. Working link 92 is connected with Node C 16 via port 44, and is connected with Node D 18 via port 58. Spare link 94 is connected with Node C 16 via port 46, and is connected with Node D 18 via port 56. A bidirectional connection 89 is provided in Node C 16 to connect working links 84, 92 via ports 44, 50.

A span 96 intermediate Node D 18 and Node E 20 includes spare links 98, 100. Spare link 98 is connected with Node D 18 via port 64, and is connected with Node E 20 via port 72. Spare link 100 is connected with Node D 18 via port 66, and is connected with Node E 20 via port 70.

Working links 93, 95 are provided to Node D 18 for connection with other components not shown in FIG. 1. Working link 93 is connected with Node D 18 via port 52; working link 95 is connected with Node D 18 via port 54. A bidirectional connection 99 is provided in Node D 18 between ports 52, 60 for establishing communications between working link 93 and a working link 112. A bidirectional connection 101 is provided in Node D 18 between ports 54, 58 for establishing communications between working links 92, 95.

A span 102 intermediate Node E 20 and Node A 12 includes a working link 104 and a spare link 106. Working link 104 is connected with Node E 20 via port 74, and is connected with Node A 12 via port 22. Spare link 106 is connected with Node E 20 via port 76 and is connected with Node A 12 via port 31.

Node E 20 is also connected with a working link 108 via port 68. Working link 108 is connected with other components not shown in FIG. 1. Such other components may be other nodes in network 10, terminating or interface nodes establishing interfaces between network 10 and another network or a telephone central office, or another communication entity. A bidirectional connection 103 is provided in Node E 20 between ports 68, 74 for establishing communications intermediate working links 104, 108.

A span 110 intermediate Node A 12 and Node D 18 includes a working link 112 and a spare link 114. Working link 112 is connected withNode A 12 via port 26, and is connected with Node D 18 via port 60. Spare link 114 is connected with Node A 12 via port 24, and is connected with Node D 18 via port 62. A bidirectional connection 109 is provided in Node A 12 between ports 22, 28 for connecting working links 72, 104. A bidirectional connection 111 is also provided in Node A 12 between ports 26, 30 for connecting working links 25, 112.

At predetermined occasions, such as whenever a node 12, 14, 16, 18, 20 is restarted, or at periodic intervals, a spare link data base (also referred to as a spare link catalog) is generated in order to maintain an up-to-date inventory of spare links available for restoration involvement. Each node 12, 14, 16, 18,20 is assigned a unique identification. Each spare link can send a continuous. "idle" message to its adjacent node, or alternatively, an "idle" message may be transmitted periodically. Idle messages preferably should include such information as the node identifications for its originating node, the port connecting the spare link with the receiving node, and the state of the port. By such manner, nodes 12, 14, 16, 18, 20 exchange information relating to spare links. The spare link database information generated from the various idle messages is preferably stored at each respective node for those spare links relating to that node. Thus, information regarding spare link 74 would be stored at nodes 12, 14; information relating to spare link 86 would be stored at nodes 14, 16. Further, information relating to spare link 94 would be stored at nodes 16, 18; information relating to spare links 98, 100 would be stored at nodes 18, 20, and information relating to spare link 114 would be stored at nodes 12, 18. Information relating to spare link 106 would be stored at nodes 12, 20.

Table 1 below is an example of a spare link database for Node D 18 in FIG. 1.

TABLE 1

| ADJACENT NODE ID | NODE CONNECTED TO (LINK ID) | LOCAL SPARE | | FAR-END SPARE | | AVAIL FOR RESTORING |
|---|---|---|---|---|---|---|
| | | PORT ID | STATE | PORT ID | STATE | |
| 12 | 114 | 62 | IS-STBY | 24 | IS-STBY | YES |
| 16 | 94 | 56 | IS-STBY | 46 | IS-STBY | YES |
| 20 | 100 | 66 | IS-STBY | 70 | OOS | NO |
| 20 | 98 | 64 | OOS | 72 | IS-STBY | NO |

Identification numbers refer to reference numerals in FIG. 1.
IS-STBY = In Service - Standby
OOS = Out of Service By such dynamic generation and update of the spare link data base for each node 12, 14, 16, 18, 20 as is contemplated by the present invention, the availability of spare links for participation in restoration configurations is automatic and continually up-to-date. The network is, thus, a self-learning network in keeping track of its restoration-related resources.

A restoration route database is generated for each node 12, 14, 16, 18, 20 and information relating to restoration routing is preferably stored at each respective node 12, 14, 16, 18, 20 relating to that node. A route-searching process is undertaken to create a restoration route database for each node 12, 14, 16, 18, 20. The route-searching process may be undertaken at the request of a network manager, or it may be periodically- or event-driven, or a combination of impetuses. A node 12, 14, 16, 18, 20 performs a route-searching by sending a probe message on its spare links to each adjacent node. Preferably only one probe message is sent per span. If there are multiple spare links available in a span, only one spare link is chosen to carry the probe message. The pro message includes the source node's identification and a hop count—a definition of the maximum number of nodes allowed to be included in a restoration path. Hop count is preferably user-settable.

When an adjacent node receives a probe message from a source node, it follows specified rules to evaluate the probe message received, and deals with the probe message according to those rules. An example of such predetermined rules is:

(1) discard the probe message if the message contains a zero hop count;

(2) discard the message if there are no spare links available to any subsequent adjacent nodes;

(3) decrement the hop count in the received probe message by one;

(4) for each span with spare links available, except for the span from which the probe message was received:
   (a) append to the end of the extant node list in the probe message an own-node identification and an indication of the number of spare links available on each span on which the probe message is to be forwarded;
   (b) arbitrarily select (or select according to some predetermined criteria) one spare link in each span on which the probe message is to be forwarded;
   (c) send (forward) the probe message to next adjacent nodes on the selected link on each span.

If the probe message arrives back at its originating node (the source node), then a restoration route has been identified. The node list compiled as each successive forwarding node appends information according to Rule (4)(a) above provides the route list for each respective restoration route identified by each returning probe message. The number of spare links available to a respective restoration route to protect a link will be the smallest number of the available spare links listed among the appended data provided by forwarding nodes.

If no probe message returns to the source node, an error report is preferably generated for alerting the network managing authority that no restoration route is available for the affected span.

Figure 2:
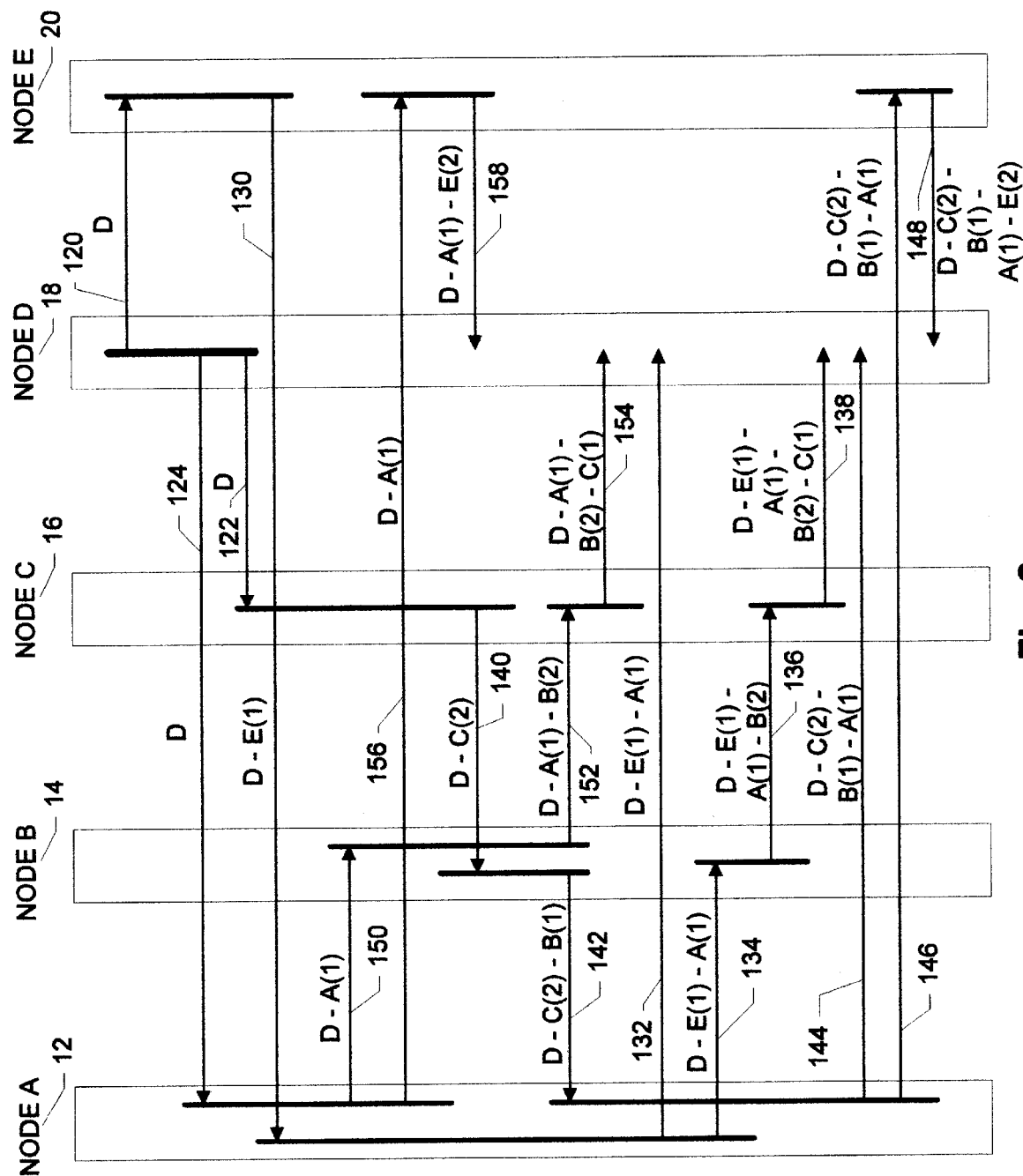
FIG. 2 is a schematic message ladder diagram illustrating an example of probe message flow and route searching originating from one node within the network illustrated in FIG. 1, according to the present invention.

FIG. 2 is a schematic message ladder diagram illustrating an example of probe message flow and route-searching originating from one node within the network illustrated in FIG. 1, according to the preferred embodiment of the present invention. In FIG. 2, the origin of a probe message from Node D 18 (FIG. 1) and route-searching by that probe message through network 10 of FIG. 1 is shown. Thus, Node D 18 originates three probe messages 120, 122, 124. Each of the probe messages 120, 122, 124 indicates that its origin is "D", i. e., Node D 18.

Probe message 120 is sent to Node E 20 on either of spare links 98, 100 (FIG. 1). For purposes of this example illustrated in FIG. 2, it is assumed that there are no occasions for discarding a probe message under the rules observed by the nodes in evaluating probe messages, such as the exemplary rules enumerated above. Further, in order to simplify the explanation of the exemplary probe messages illustrated in FIG. 2, it is assumed that all links are in service and in standby mode (i.e., the exemplary information contained in Table 2 above does not apply to the following explanation of FIG. 2)

Node E 20 forwards probe message 120 as a forwarded probe message 130 to Node A 12 on spare link 106 (FIG. 1). The information appended to forwarded probe message 130 indicates that probe message 130 originated with Node D 18 and traveled via Node E 20, and that span 102 from Node E 20 to Node A 12 has one spare link: "D-E(1)". Node A 12 then forwards forwarded probe message 130 to Node D 18 as a forwarded probe message 132 via spare link 114. Thus, forwarded probe message 132 is a returned probe message which originated at Node D 18, and contains a complete restoration route in its appended information. The restoration route proceeds from Node D 18 via one of spare links 98, 100 to Node E 20, thence to Node A 12 via spare link 106 in span 102 (having one spare link available), and thence back to Node D 18 via spare link 114 in span 110 (having one spare link available). This information is contained in the message information of forwarded probe message 132: "D-E(1)-A(1)".

Node A 12 also forwards forwarded probe message 130 to Node B 14 as a forwarded probe message 134. The information appended to forwarded probe message 134 indicates that forwarded probe message 134 originated with Node D 18 and traveled via Node E 20 and via Node A 12. The appended information also indicates that span 102 from Node E 20 and span 70 from Node A 12 each has one spare link: "D-E(1)-A(1)".

Node B 14 then forwards forwarded probe message 134 to Node C 16 via either of spare links 86, 87 as a forwarded probe message 136. The information appended to forwarded be message 136 indicates that forwarded probe message 136 originated with Node D 18 and traveled via Node E 20, via Node A 12 and via Node B 14. The appended information also indicates that each span 102, 70 from Node E 20 and from Node A 12 has one spare link, and that span 82 from Node B 14 has two spare links : "D-E(1)-A(1)-B(2)".

Node C 16 then forwards forwarded probe message 136 to Node D 18 on spare link 96 as a forwarded message 138. Thus, forwarded probe message 138 is a returned probe message which originated at Node D 18, and contains a complete restoration route in its appended information. The restoration route proceeds from Node D 18 via one of spare links 98, 100 of span 96 and travels via Node E 20, via span 102, via Node A 12, via span 70, via Node B 14, via span 82, via Node C 16, and via span 90. The message information of forwarded probe message 138 also indicates that each span 102, 70, 90 from Node E 20, Node A 12, and Node C 16 has one spare link, and that span 82 from Node B 14 has two spare links: "D-E(1)-A(1)-B(2)-C(1)".

Probe message 122 is sent from Node D 18 to Node C 16 via spare link 94 (FIG. 1). Node C 16 forwards probe message 122 to Node B 14 as a forwarded probe message 140 via either of spare links 86, 87. The information appended to forwarded probe message 140 indicates that forwarded probe message 140 originated with Node D 18 and traveled via Node C. The appended information also indicates that span 82 from Node C 16 has two spare links: "D-C(2)".

Node B 14 then forwards forwarded probe message 140 to Node A 12 via spare link 74 as a forwarded probe message 142. The information appended to forwarded probe message 142 indicates that forwarded probe message 142 originated with Node D 18 and traveled via Node C 16 and via Node B 14. The appended information also indicates that span 82 from Node C 16 has two spare links, and span 70 from Node B 14 has one spare link: "D-C(2)-B(1)".

Node A 12 then forwards forwarded probe message 142 to Node D 18 via spare link 114 as a forwarded probe message 144. Thus, forwarded probe message 144 is a returned probe message which originated at Node D 18, and contains a complete restoration route in its appended information. The restoration route proceeds from Node D 18 via spare link 94 of span 90 and travels via Node C 16, via span 82, via Node B 14, via span 70, via Node A 12, and via span 110. The message information of forward robe message 144 also indicates that span 82 from Node C 16 has two spare links, and each span 70, 110 from Node B 14 and from Node A has one spare link: "D-C(2)-B(1)-A(1)".

Node A 12 also forwards forwarded probe message 142 to Node E 20 as a forwarded probe message 146. The information appended to forwarded probe message 146 indicates that forwarded probe message 146 originated with Node D 18 and traveled via Node C 16, via Node B 14, and via Node A 12. The appended information also indicates that span 82 from Node C 16 has two spare links, and each span 70, 102 from Node B 14 and from Node A 12 has one spare link: "D-C(2)-B(1)-A(1)".

Node E 20 then forwards forwarded probe message 146 to Node D 18 via one of spare links 98, 100 as a forwarded probe message 148. Thus, forwarded probe message 148 is a returned probe message which originated at Node D 18, and contains a complete restoration route in its appended information The restoration route proceeds from Node D 18 via spare link 94 of span 90 and travels via Node C 16, via span 82, via Node B 14, via span 70, via Node A 12, via span 102, via Node E 20 and via span 96. The message information of forwarded probe message 148 also indicates that each span 82, 96 from Node C 16 and from Node E 20 has two spare links, and each span 70, 110 from Node B 14 and from Node A 12 has one spare link: "D-C(2)-B(1)-A(1)-E(2)".

Probe message 124 is sent from Node D 18 to Node A 12 via spare link 114 (FIG. 1). Node A 12 forwards probe message 124 to Node B 14 as a forwarded probe message 150 via spare link 74 of span 70. The information appended to forwarded probe message 150 indicates that forwarded probe message 150 originated with Node D 18 and traveled via Node A 12. The appended information also indicates that span 70 from Node A 12 has one spare link: "D-A(1)".

Node B 14 then forwards forwarded probe message 150 to Node C 16 via either of spare links 86, 87 as a forwarded probe message 152. The information appended to forwarded probe message 152 indicates that forwarded probe message 152 originated with Node D 18 and traveled via Node A 12 and via Node B 14. The appended information also indicates that span 82 from Node B 14 has two spare links, and span 70 from Node A 12 has one spare link: "D-A(1)-B(2)".

Node C 16 then forwards forwarded probe message 152 to Node D 18 via spare link 90 as a forwarded probe message 154. Thus, forwarded probe message 154 is a returned probe message which originated at Node D 18, and contains a complete restoration route in its appended information. The restoration route proceeds from Node D 18 via spare link 114 of span 110 and travels via Node A 12, via span 70, via Node B 14, via span 82, via Node C 16, and via span 90. The message information of forwarded probe message 154 also indicates that span 82 from Node B 14 has two spare links, and each span 70, 90 from Node A 12 and from Node C 16 has one spare link: "D-A(1)-B(2)-C(1)".

Node A 12 also forwards probe message 124 to Node E 20 as a forwarded probe message 156 via spare link 106 of span 102. The information appended to forwarded probe message 156 indicates that forwarded probe message 156 originated with Node D 18 and traveled via Node A 12. The appended information also indicates that span 102 from Node A 12 has one spare link: "D-A(1)".

Node E 20 then forwards forwarded probe message 156 to Node D 18 via either of spare links 98, 100 as a forwarded probe message 158. Thus, forwarded probe message 158 is a returned probe message which originated at Node D 18, and contains a complete restoration route in its appended information. The restoration route proceeds from Node D 18 via spare link 114 of span 110 and travels via Node A 12, via span 102, via Node E 20, and via span 96. The message information of forwarded probe message 158 also indicates that span 96 from Node E 20 has two spare links, and span 102 from Node A 12 has one spare link: "D-A(1)-E(2)".

By the exemplary creation of probe messages described in connection with FIG. 2 to determine restoration routes relating to Node D 18, similar restoration route creation can be effected with respect to other nodes in network 10 of FIG. 1. In the interest of simplicity, such redundant examples will not be presented here.

The determination of restoration routes, as illustrated in FIG. 2, allows the creation of a restoration route data base at each respective node 12, 14, 16, 18, 20. Thus, for example, Table 2 reflects the unidirectional restoration routes determined by the procedure discussed above in connection with FIG. 2.

TABLE 2

| RESTORATION ROUTE | NUMBER OF SPARE LINKS AVAILABLE IN THIS ROUTE | CAN BE USED TO PROTECT SPAN |
|---|---|---|
| D→C→B→A→D | 1 | D→C, A→D |
| D→A→B→C→D | 1 | D→A, C→D |
| D→E→A→D | 1 | D→E, A→D |
| D→A→E→D | 1 | D→A, E→D |
| D→E→A→B→C→D | 1 | D→E, C→D |
| D→C→B→A→E→D | 1 | D→C, E→D |

Alternatively, a bidirectional restoration route data base may also be created, once both directions of the restoration routes are verified. Table 3 illustrates such a bidirectional restoration route data base for Node D 18.

TABLE 3

| RESTORATION ROUTE | NUMBER OF SPARE LINKS AVAILABLE IN THIS ROUTE | CAN BE USED TO PROTECT SPAN |
|---|---|---|
| D — C - B — A - D | 1 | D↔C, D↔A |
| D — E — A — D | 1 | D↔E, D↔A |
| D — C — B — A — E - D | 1 | D↔C, D↔E |

Of course, the configuration of a network such as network 10 (FIG. 1) may likely change after a determination of restoration routes has been made and stored in a restoration route data base. Network configuration changes may be caused by such things as changing working connections, installing a new node in the network, maintenance actions, or other causes. It is imperative that the restoration route data be kept up-to-date at each node in a network in order that proper restoration operations may be effected at any time. It is, therefore, preferable that the restoration route data base be configured to facilitate updating at least (1) periodically according to a timer, (2) when the network system is initialized, (3) when requested by the network manager, (4) when a connection is made, (5) when a local working/ spare configuration is altered, and (6) after an automatic restoration has taken place.

It is this capability to distribute the restoration routes as they apply to each node in a network for storage at each respective node that gives rise to the terminology, "distributed restoration". Of course, storage of restoration routes may be distributed among nodes in a network in any pattern desired; it is not an absolute requirement that each node store its own restoration route information and spare link information. For example, a network may be segmented into regions and restoration information may be stored at a regional center for those nodes in a respective network region. The preferred embodiment of the present invention contemplates storage of restoration information—including spare link information and restoration route information—at each respective node affected by the stored information.

Figure 3:
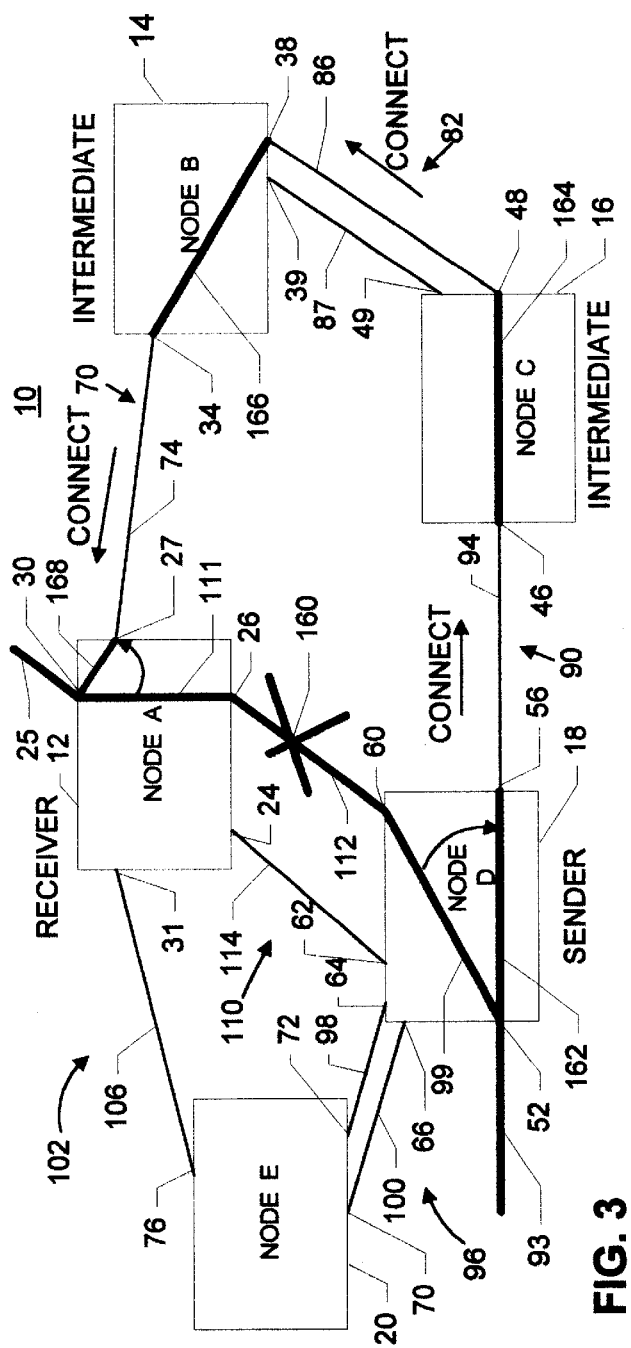
FIG. 3 is a schematic diagram of a portion of the simplified network presented in FIG. 1, illustrating automatic restoration according to the present invention.

FIG. 3 is a schematic diagram of a portion of network 10 presented in FIG. 1, illustrating automatic restoration according to the present invention. In FIG. 3, network 10 is illustrated in somewhat simplified form. Only spare links 74, 86, 87, 98, 100, 106. 114 are illustrated. Only the existing network route connecting working link 93 with working link 25 via working link 112 intermediate Node A 12 and Node D 18, and via bidirectional connections 99, 111 is illustrated. In FIG. 3, working link 112 is failed, as indicated by a break 160. It is the usual case that a failed link exhibits signal failures in both directions between custodial nodes, the nodes adjacent to a span containing a failed link. In such situations, both custodial nodes detect the fault substantially simultaneously. It is necessary to ensure that only one restoration path is established for each fault. For that reason, the preferred embodiment of the present invention provides that detection of a fault will cause only one custodial node to initiate a restoration action. In order to effect this result, the restoration system responds to detection of a fault by designating one of the custodial nodes a Sender Node and the other of the custodial nodes a Receiver Node. The role designation (i.e., Sender Node and Receiver Node) by the restoration system is preferably provided automatically. Such an automatic operation may be effected, for example, by each node keeping track of its own node identification designation (ID) and adjacent nodes" Ids. In the event of a fault, the custodial nodes will necessarily be adjacent nodes. Thus, a simple operational rule may be employed, such as by way of example, when an adjacent node has an ID greater than a given node's own ID, then the adjacent node is designated as a Sender Node, and the given node making the comparison of ID's is designated as a Receiver Node. Thus, each custodial node associated with a fault can independently determine whether it is a Sender Node or a Receiver Node without communicating with any other nodes.

Thus, when working link 112 fails, custodial nodes— Node A 12 and Node D 18—detect the fault substantially simultaneously. In the illustration of FIG. 3, Node D 18 is designated the Sender Node, and Node A 12 is designated the Receiver Node.

After a fault is detected, the Sender Node (Node D 18 in FIG. 3) will:

(1) Select a restoration route based upon its respective restoration route data base. If multiple restoration routes are available, the Sender Node will select only one restoration route according to predetermined criteria. For example, the Sender Node may choose the restoration route having the fewest number of nodes involved.

(2) Select a spare link from the Sender Node which is in the selected restoration route. This action preferably also includes updating the state of the spare link in the affected spare link catalog, and decrementing the available spare link counter of the selected route in order that the automatic restoration process will work properly if subsequent link failures occur in the same span.

(3) Create a connection message which includes the following information:
   (a) Sender Node's identification
   (b) Receiver Node's identification
   (c) Node list of the selected restoration route
   (d) Port (on the failed link) td be rolled from by the Receiver (4) Send the connection message to the adjacent node in the restoration route via the spare link included in the selected restoration route (5) Effect a bidirectional connection to route traffic to the spare port selected for inclusion in the restoration route.

Upon receiving the connection message, each Intermediate Node in the selected restoration route intermediate the Sender Node and the Receiver Node will:

(1) Select a spare link for connecting to the next subsequent node of the selected restoration route (2) Forward the connection message to the next subsequent node via the chosen spare link (3) Establish a bidirectional cross-connection between the port where the connection was received and the port from which the connection was forwarded (4) Decrement the available spare link counter.

The Receiver Node completes the automatic restoration action upon receiving the connection message by:

(1) Routing traffic from the port (to be rolled from) specified by the Sender Node in the connection message to the port from which the connection message is received. Such routing may, for example, be effected using a cross-point switch.

(2) Routing traffic in the opposite direction onto the same bidirectional port from which the connection message is received. Such routing may, for example, be effected using a head-end-bridge.

(3) Once traffic sent from the Receiver Node reaches the Sender Node on the spare link included in the selected restoration route, automatic restoration is complete.

It is noteworthy that neither the Sender Node nor the Receiver Node has any information relating to the ports selected by the Intermediate Nodes during the restoration operation. A report message relating paths used for restoration could be issued automatically as part of the automatic restoration process, from either the Sender Node or the Receiver Node, if desired.

In a situation where multiple simultaneous failures occur, spare links may be assigned on a first-come-first-served basis, according to a predetermined priority scheme, or according to some other criteria.

Thus, in the example illustrated in FIG. 3, upon detecting the fault caused by break 160, Sender Node 18 sends a connection message to Receiver Node 12 advising Receiver Node 12 of the identity of Sender Node 18, reciting the identity of Receiver Node 12, and specifying the node list of the chosen restoration route. In FIG. 3, the chosen restoration route is to be established via nodes 16, 14. The connection message from Sender Node 18 to Receiver Node 12 will also specify the port 26 to be rolled from by Receiver Node 12.

Sender Node 18 sends the connection message to adjacent Intermediate Node 16 via the chosen spare link 94 (in this case, the only available spare link for span 90). Sender Node 18 also establishes a bidirectional connection 162 to connect traffic from its port 52 to port 56 to effect traffic routing to chosen spare link 94.

Intermediate Node 16 selects a spare link connecting the next node of the selected restoration route, Intermediate Node 14. In the example of FIG. 3, Intermediate Node 16 chooses spare link 86 for connection with Intermediate Node 14. The connection message is forwarded to Intermediate Node 14 via selected spare link 86. Intermediate Node 16 also establishes a bidirectional connection 164 to effect a bidirectional cross-connection between ports 46, 48, thereby connecting spare links 94, 86.

Intermediate Node 14 selects a spare link connecting the next node of the selected restoration route, Receiver Node 12. In the example of FIG. 3, Intermediate Node 14 chooses spare link 74, the only spare link available for connection with Receiver Node 12. The connection message is forwarded to Receiver Node 12 via selected spare link 74. Intermediate Node 14 also establishes a bidirectional connection 166 to effect a bidirectional cross-connection between ports 38, 34, thereby connecting spare links 74, 86.

Receiver Node 12 receives the connection message and switches traffic from port 26 to port 27, the port on which the connection message was received. Receiver Node 12 also establishes a bidirectional connection 168 connecting ports 27, 30 in order to direct traffic received from working link 25 to port 27 and, thence, to the selected restoration route. Once traffic is received by Sender Node 18 from Receiver Node 12 via the restoration route through Intermediate Nodes 14, 16, the automatic restoration operation is completed.

Figure 4:
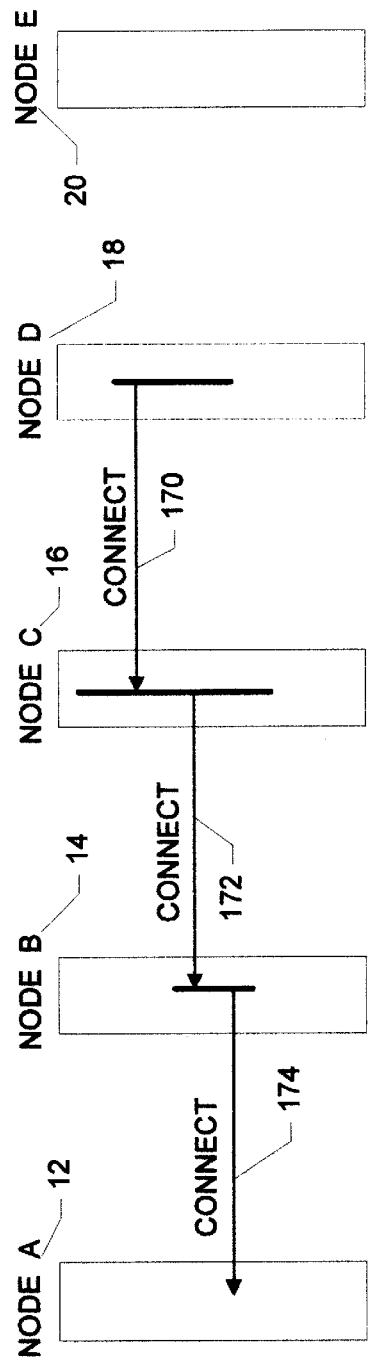
FIG. 4 is a schematic message ladder diagram illustrating messages effecting the automatic restoration represented in FIG. 3.

FIG. 4 is a schematic message ladder diagram illustrating messages effecting the automatic restoration represented in FIG. 3. In FIG. 4, Node D 18, is a custodial node with respect to break 160 (FIG. 3), and is designated the Sender Node 18. Sender Node 18 sends a connection message 170 to adjacent Intermediate Node 16 in the selected restoration route (FIG. 3) via spare link 94. Intermediate Node 16 forwards the connection message 170 as a forwarded connection message 172 to Intermediate Node 14 via spare link 86, and Intermediate Node 16 performs other functions and operations such as establishing bidirectional connection 164, as described above in connection with FIG. 3. Intermediate Node 14 forwards forwarded connection message 172 as a forwarded connection message 174 to Receiver Node 12 via spare link 74, and Intermediate Nodel 14 performs other functions and operations such as establishing bidirectional connection 166, as described above in connection with FIG. 3.

Receiver Node 12 receives forwarded connection message 174 and effects connection via bidirectional connection 168 with working link 25. When communication is established from Receiver Node 12 to Sender Node 18 via spare link 74, via Intermediate Node 14, via spare link 86, via Intermediate Node 16, and via spare link 94, then the automatic restoration operation is completed.

In the event of a unidirectional failure of a link, the preferred embodiment of the present invention effects a bidirectional restoration. Upon detection of an incoming link failure, a far end failure indication may be inserted in an outgoing message from the node detecting the far end failure. This event will trigger an automatic bidirectional restoration operation to establish bidirectional communications as described hereinbefore.

FIG. 5 is a schematic diagram of a portion of the simplified network presented in FIG. 1, illustrating normalization of routing after link repair, according to the present invention. In FIG. 5, link 112 is repaired and any required wait-to-restore time imposed by the system operator has expired. Link 112 is ready for service. Sender Node 18 thereupon sends a return-to-normal command message via the repaired, original link 112. Receiver Node 12 verifies that link 112 is in a valid state for reversion to normal operations, and then switches traffic back to its original path via bidirectional connection 111 between ports 26, 30. Receiving Node 12 then sends a confirmation response message to Sender Node 18 via the original link 112. After Sender Node 18 receives the confirmation response message via link 112, Sender Node 18 switches traffic back to its original path along bidirectional connection 99 between ports 52, 60, drops bidirectional connection 162, and sends a disconnect message to Receiver Node 12 via the restoration path. The restoration path connections and bidirectional connections 164, 166, 168 in Intermediate Nodes 14, 16 and in Receiver Node 12 are discontinued upon receiving the disconnect message.

FIG. 6 is a schematic message ladder diagram illustrating messages effecting the normalization of routing represented in FIG. 3. In FIG. 6, Node D 18, is a custodial node with respect to break 160 (FIG. 3), and is designated the Sender Node 18. Sender Node 18 sends a return-to-normal message 180 to Receiver Node 12 via original, restored, link 112. Receiver Node 12 verifies that link 112 is ready for service, and then sends a confirmation message 182 to Sender Node 18 via link 112. At this point, Receiver Node 12 also switches its traffic back to its original traffic path via bidirectional connection 111 to link 112. After receiving confirmation message 182 from Receiving Node 12 via link 112, Sending Node 18 switches its traffic back to its original path via bidirectional connection 99 to link 112, drops bidirectional connection 162 to spare link 94, and sends a disconnect message 184 to Receiver Node 12 via the restoration route—spare link 94, bidirectional connection 164, spare link 86, bidirectional connection 166 and spare link 74. Intermediate Node 16 forwards disconnect message 184 to Intermediate Node 14 as a forwarded disconnect message 186. Intermediate Node 14 forwards forwarded disconnect message 186 to Receiver Node 12 as a forwarded disconnect message 188. As each node 16, 14, 12 receives disconnect message 184, 186, 188 it drops its respective bidirectional connection: Intermediate Node 16 drops bidirectional connection 164, Intermediate Node 14 drops bidirectional connection 166, and Receiver Node 12 drops bidirectional connection 168.

The preceding description relating to a link-based restoration for a network is equally applicable for establishing a path-based restoration method and apparatus. The decisions and storage requirements will be markedly more complex in the case of a path-based system. However, the principles and teachings set forth herein for a link-based system and method are equally viable and applicable for a path-based system. For example, in a path-based system, rather than having two custodial nodes adjacent a link break being designated Sender Node and Receiver Node, one path-terminating node would be designated as Sender Node and the other path-terminating node would be designated as Receiver Node. Thus, node identifications would necessarily be exchanged between the two path-terminating nodes, rather than two custodial nodes. Further, a restoration route data base of a path-based system would contain restoration routes from one path-terminating mode to another path-terminating node so that, in building restoration routes with probe messages, as taught herein, a probe message originating node will only select routes for storage as possible restoration routes those routes which are established by returning probe messages having reached the other path-terminating node. When a failure occurs in a path-based restoration system according to the teachings of the present invention, custodial nodes to the failed link need to identify the affected span to path termination nodes so that routes containing the failed span will not be selected for inclusion in a restoration route.

Figure 7:
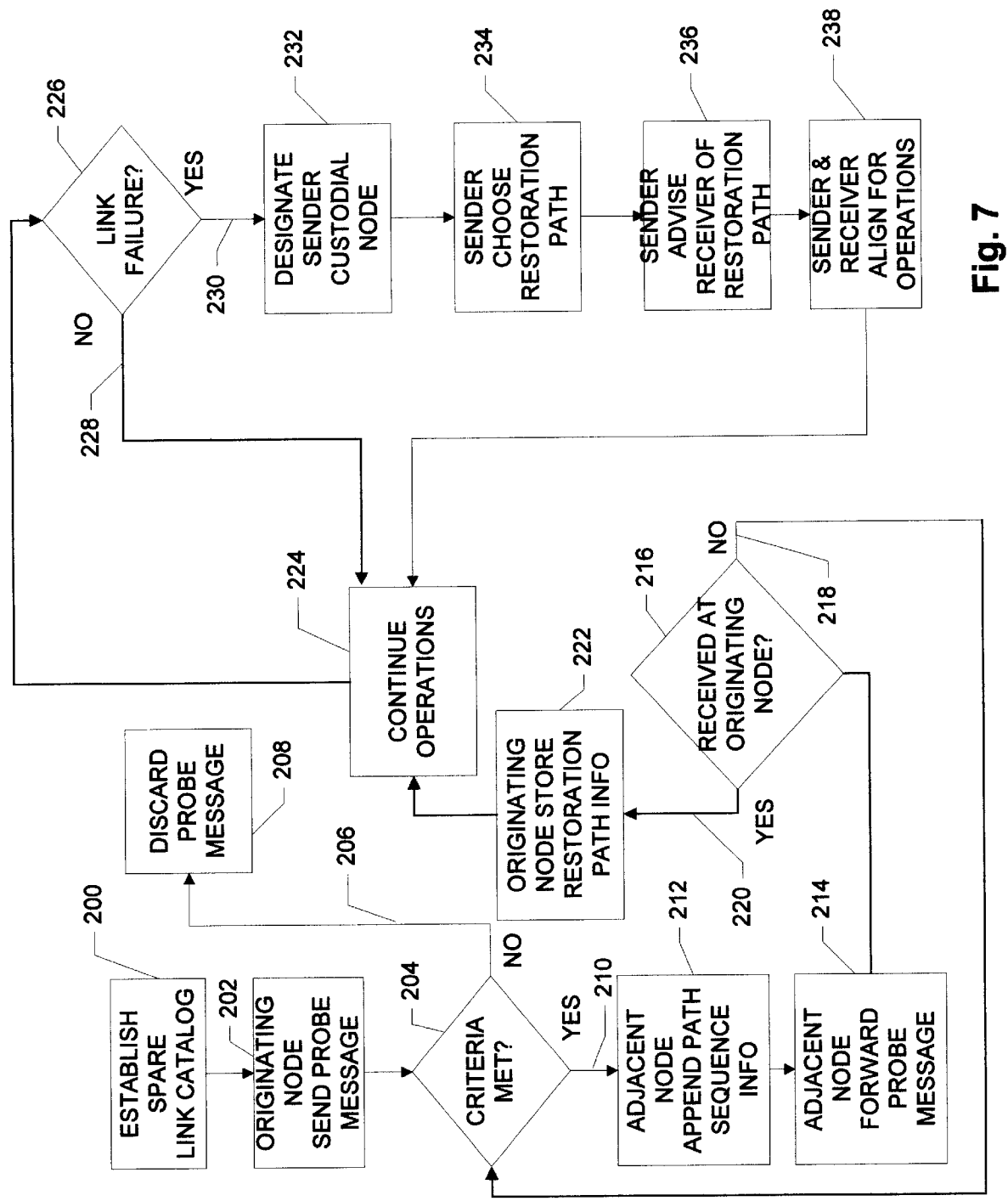
FIG. 7 is a schematic flow diagram illustrating the preferred embodiment of the method of the present invention.

FIG. 7 is a schematic flow diagram illustrating the preferred embodiment of the method of the present invention. In FIG. 7, spare links are identified by sending idle messages, preferably periodically as well as on the occurrence of particular events, and a spare link catalog is established and stored, preferably at each respective node in the network to which the spare links connect, as indicated by block 200.

Periodically and on occurrence of predetermined events, each node, operating as a probe originating node, sends a probe message to each adjacent node in the network over an unassigned link, as indicated by block 202. Each adjacent node, upon receiving a probe message, evaluates the probe message according to predetermined criteria, as indicated by query block 204 (and as described in greater detail hereinbefore). If the probe message does not meet the predetermined criteria, then the method proceeds according to "NO" response path 206, and the probe message is discarded, as indicated by block 208.

If the probe message meets the predetermined criteria, then the method proceeds according to "YES" response path 210, and the probe message is forwarded to each next adjacent node, as indicated by block 212. Message content indicating the path sequence traversed by the probe message proceeding through the network is appended to the forwarded probe message, as indicated by block 214.

The method proceeds to query block 216 where the node receiving the forwarded probe message inquires whether the probe message received was originated by the node making the query. If the forwarded probe message was not originated by the then-evaluating node, then the method proceeds according to "NO" response path 218 to query block 204, and the forwarded probe message is again examined according to predetermined criteria. The method proceeds from query block 204 according to whether the forwarded probe message meets the predetermined criteria, as described before. If the forwarded probe message was originated by the node conducting the inquiry according to query block 216, then the forwarded probe message is a returned probe message and the method proceeds according to "YES" response path 220. In such case, a restoration route has been established, and restoration path information is stored, according to block 222. Thereafter, network operations are continued, according to block 224.

So long as there is no link failure, as indicated by a negative response to the query posed by query block 226, the process continues via "NO" response path 228, and operations continue, as indicated by block 224. When a link failure occurs, the process proceeds from query block 226 via "YES" response path 230, and one of the custodial nodes adjacent the span containing the failed link is designated as a Sender Node according to block 232; the other custodial node is designated as a Receiver Node. The Sender Node chooses a restoration path from the stored restoration path data stored pursuant to block 222, as indicated by block 234. The Sender Node then advises the Receiver Node of the restoration path chosen, communicating the notice via the chosen restoration path, as indicated by block 236. The Sender Node and Receiver Node, and any Intermediate Nodes involved in the restoration path chosen by the Sender Node according to block 234, align for operations via the restoration path, as indicated by block 238. Once the Sender Node, Receiver Node and involved Intermediate Nodes are aligned for operations via the restoration path, the system continues operations, according to block 224.

In its most preferred embodiment, the present invention is used in a SONET/SDH environment. The invention can, of course be used with other communication environments. An example of using the invention with a SONET/SDH environment contemplates that the 94 unused D1 and D2 bytes or K1 and K2 bytes in a SONET OC-48 section, or line overhead can be used to transport the messages required for implementing the present invention. A cross-connect switch should have the capability to drop and insert messages. The idle message for determining spare links for inclusion in the spare link catalog is preferably transmitted continually at a rate provided by the network manager. All other messages associated with the present invention are preferably transmitted one time in at least three consecutive frames in a SONET/SDH system. Upon receipt, all messages are preferable integrated over three frames for validation purposes. A summary of suggested message content and formats, with suggested bit-sizes in parentheses, follows:

Idle Message—Transmitted regularly in all spare inks
   Message Type (4)
   Source Node Identification (8)
   Port Number (16)
   Far-End Failure Indicator (1)—Set when incoming signal failure is detected in order to trigger bidirectional restoration Probe Message—Transmitted when route-searching is requested to rebuild the restoration route database. The nodes receiving the probe messages append their Node Identifications and number of available spare links to the restoration route section of the message.
   Message Type (4)
   Source Node Identification (8)
   Hop Count (8)
   Restoration Route—Containing X records of:
     Node Identification (8)
     Number of available spare links (8)

Connect Message—Transmitted when switching to a restoration path.
   Message Type (4)
   Sender Node Identification (8)
   Receiver Node Identification (8)
   Receiver Port (to be switched from) (16)
   Restoration Route—Containing X records of Node Identification (8)
   Exercise Flag (1)—set if conducting an exercise
   Manual Restoration Flag (1)—set if manual restoration is desired Report Path Message—A path data request or report Return to Normal Request Message—Transmitted when returning back to original configuration
   Message Type (4)
   Sender Node Identification (8)
   Receiver Node Identification (8)

Return to Normal Confirmation Message—Transmitted when Return to Normal message is received.
   Message Type (4)
   Sender Node Identification (8)
   Receiver Node Identification (8)

Disconnect Message—Transmitted to return to original configuration or to undo a restoration.
   Message Type (4)
   Sender Node Identification (8)
   Receiver Node Identification (8)
   Exercise Flag (1)—Set if conducting an exercise.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:

1. A method for distributed restoration in an optical mesh having a plurality of nodes, comprising the steps of:
at periodic intervals, updating a spare link database, wherein the spare link database includes information relating to spare links between each node and adjacent nodes in the optical mesh network and availability of the spare links for restoration;
at periodic intervals, updating a restoration route database for each node in the optical mesh network, wherein the step of updating a restoration route database comprises the steps of:

transmitting a probe message by each node to be forward through the optical network, wherein the probe message includes an indentification of a source node and a maximum number of hops allowed in a restoration path; and receiving the probe message by the source node, wherein the probe message includes a node list comprised of a node identification appended by each successive forwarding node that can be used as a complete restoration route and number of spare links along the restoration route, wherein the node list includes less than or equal to the maximum number of hops allowed in the restoration path; and in response to detection of a fault in a working link, selecting a restoration route from the restoration route database and establishing the restoration route in the optical network.

2. The method in claim 1 for distributed restoration in an optical mesh network, wherein the step of, at periodic intervals, updating a spare link database, wherein the spare link database includes information relating to spare links between each node and adjacent nodes in the optical mesh network and availability of the spare links for restoration, comprises:

transmitting idle messages by each node to adjacent nodes, wherein the idle message identifies the originating node of the message, a port identification of a port connecting a spare link with the adjacent node, and state of the port;

receiving by each node idle messages from adjacent nodes; and updating a spare link database stored at each node, wherein the spare link database at each node includes information relating to spare links connecting each node to its adjacent nodes and availability of the spare links for restoration.

3. The method in claim 1 for distributed restoration in an optical mesh network, wherein the step of, transmitting a probe message by each node to be forwarded through the optical network, wherein the probe message includes an identification of a source node and a maximum number of hops allowed in a restoration path, comprises:

transmitting a probe message from each node to each adjacent node connected by a spare link, wherein the probe message includes an identification of a source node and a maximum number of hops allowed in a restoration path.

4. The method in claim 3 for distributed restoration in an optical mesh network, wherein the step of, at periodic intervals, updating a restoration route database for each node in the optical mesh network, further comprises the steps of:

receiving a probe message by a node in the optical network, that is not the source node, from an adjacent node;

determining a hop count for the probe message and discarding the message if the hop count exceeds the maximum number of hops allowed in a restoration path;

determining spare links available for restoration to a subsequent adjacent node;

appending an identification of the node to a node list in the probe message and number of spare links available for restoration between the node and the subsequent adjacent node; and transmitting the probe message to the subsequent adjacent node.

5. The method in claim 4 for distributed restoration in an optical mesh network, wherein the step of, at periodic intervals, updating a restoration route database for each node in the optical mesh network, further comprises the steps of:

in response to receiving the probe message by the source node, updating a restoration route database stored at the source node with the restoration route derived from the node list and the number of spare links available for restoration between each node along the restoration route.

6. The method of claim 5 for distributed restoration in an optical mesh network, wherein the step of, in response to detection of a fault in a working link, selecting a restoration route from the restoration route database and establishing the restoration route in the optical network, comprises the steps of:

detecting a failure in a working link between a first node and a second node in the optical network;

designating one node of the first node and the second node as a sender node, and the other node as a receiver node;

selecting a restoration route from the restoration route database stored at the sender node according to predetermined route selection criterion;

creating a connection message by the sender node, wherein the connection message provides information relating to the nodes in the selected restoration route and the working link with a failure; and transmitting the connection message to an adjacent node in the selected restoration route.

7. The method of claim 6 for distributed restoration in an optical mesh network, wherein the step of, selecting a restoration route from the restoration route database stored at the sender node according to predetermined route selection criterion, further comprises the steps of:

selecting a restoration route from the restoration route database having a fewest number of hops.

8. A node in a mesh network that is connected to one or more adjacent nodes, comprising:

a spare link catalog stored in the node that includes a list of any spare links between the node and one or more adjacent nodes and availability of such spare links for restoration, wherein the node periodically updates the spare link catalog by transmitting and receiving idle messages between the one or more adjacent nodes;

a restoration route register stored in the node that includes a list of restoration routes, wherein the node periodically updates the restoration route register by transmitting a probe message to the one or more adjacent nodes and receiving the returned probe message having a node identification appended by each successive forwarding node; and wherein the node selects one of the restoration routes stored in the restoration route register in response to a failure in a working link connected to an adjacent node and transmits a connection message with information on the selected restoration route to an adjacent node in the selected restoration route.

9. The node in claim 8, wherein the spare link catalog further includes an identification of the one or more adjacent nodes, port identification for any spare links at the node and the one or more adjacent nodes, and status of such spare links.

10. The node in claim 9, wherein the restoration route register further includes a number of spare links available along the restoration routes and identification of working links that each restoration route can be used to protect in the event of a failure on such working links.

11. The node in claim 10, wherein the node selects the restoration route stored in the restoration route register with the least number of hops in response to a failure in a working link.

* * * * *